United States Patent
Argyropoulos et al.

(10) Patent No.: US 7,232,859 B2
(45) Date of Patent: Jun. 19, 2007

(54) POLYURETHANE DISPERSION AND ARTICLES PREPARED THEREFROM

(75) Inventors: John N. Argyropoulos, Scott Depot, WV (US); Paul Foley, Midland, MI (US); Debkumar Bhattacharjee, Lake Jackson, TX (US); Bedri Erdem, Pearland, TX (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 10/531,944

(22) PCT Filed: Oct. 28, 2003

(86) PCT No.: PCT/US03/34196

§ 371 (c)(1),
(2), (4) Date: Apr. 19, 2005

(87) PCT Pub. No.: WO2004/041890

PCT Pub. Date: May 21, 2004

(65) Prior Publication Data

US 2006/0058453 A1    Mar. 16, 2006

(51) Int. Cl.
*C08J 3/00*   (2006.01)
*C08K 3/20*   (2006.01)
*C08L 75/00*  (2006.01)
*B32B 27/00*  (2006.01)

(52) U.S. Cl. .......... 524/591; 428/423.1; 524/589; 524/590; 524/839; 524/840

(58) Field of Classification Search ............... 524/589, 524/590, 591, 839, 840; 428/423.1
See application file for complete search history.

(56) References Cited

U.S. PATENT DOCUMENTS

| 3,444,164 | A   | 5/1969  | Luethi et al. |
| 3,830,785 | A   | 8/1974  | Matsui et al. |
| 4,237,264 | A   | 12/1980 | Noll et al. |
| 4,621,113 | A   | 11/1986 | Collins |
| 4,909,597 | A   | 3/1990  | Parker et al. |
| 5,548,022 | A * | 8/1996  | Ito et al. ..................... 524/839 |
| 5,648,412 | A   | 7/1997  | Mistry et al. |
| 5,719,229 | A   | 2/1998  | Pantone et al. |
| 6,262,296 | B1  | 7/2001  | Nomura et al. |
| 6,569,533 | B1* | 5/2003  | Uchida et al. ........... 428/423.1 |
| 6,620,893 | B1  | 9/2003  | Melchiors et al. |

FOREIGN PATENT DOCUMENTS

WO    WO 02055576    7/2002

* cited by examiner

*Primary Examiner*—Patrick D. Niland

(57) ABSTRACT

The present invention is to a polyurethane dispersion and products produced therefrom wherein the dispersion contains a polyurethane prepolymer produced from the a reaction of an excess of a polyisocyanate with an isocyanate reactive molecule wherein the polyisocyanate is a bis(isocyanatomethyl)cyclohexane. Preferably the isocyanate comprises (i) trans-1,4-bis(isocyanatomethyl)cyclohexane or (ii) an isomeric mixture of two or more of cis-1,3-bis(isocyanatomethyl)cyclohexane, trans-1,3-bis(isocyanatomethyl)cyclohexane, cis-1,4-bis(isocyanatomethyl)cyclohexane and trans-1,4-bis(isocyanatomethyl)cyclohexane, with the proviso said isomeric mixture comprises at least about 5 weight percent of said trans-1,4-bis(isocyanatomethyl)cyclohexane.

24 Claims, 2 Drawing Sheets

POLYURETHANE DISPERSION AND ARTICLES PREPARED THEREFROM

Figure 1:
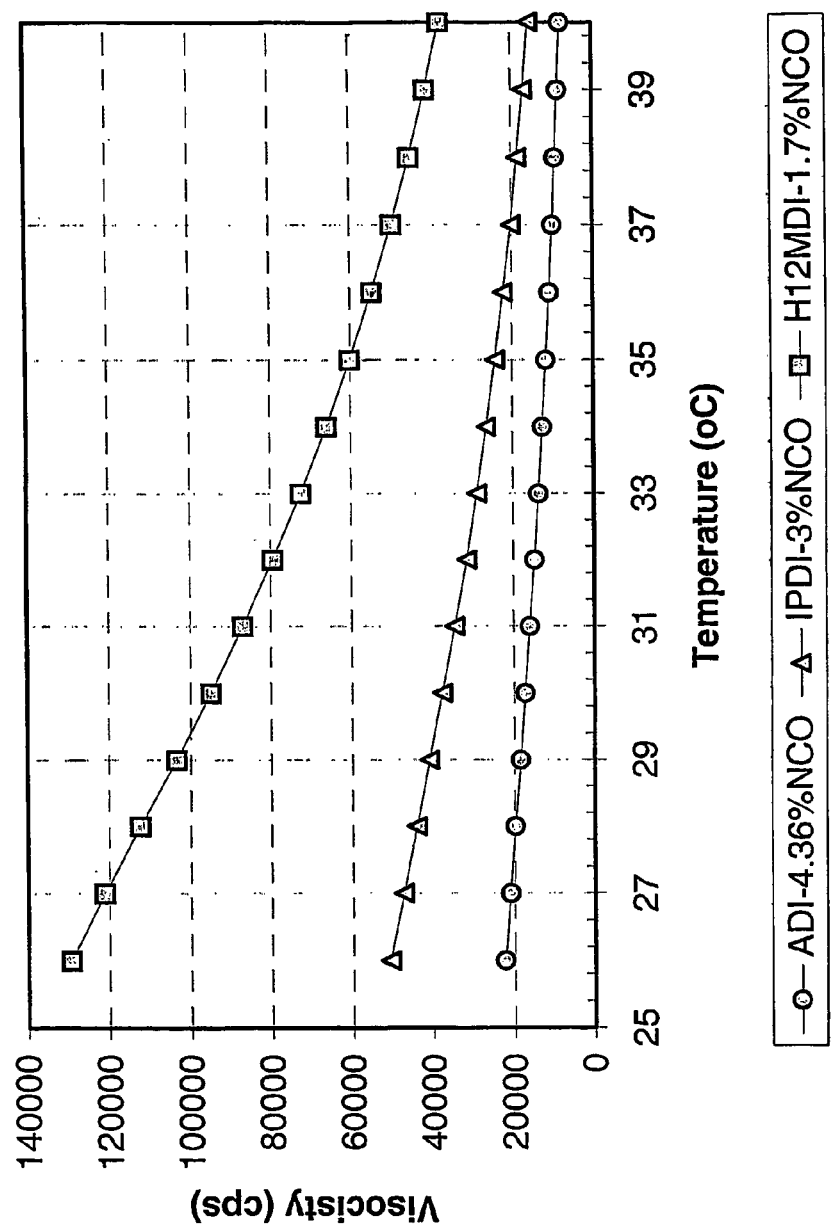

This invention relates to polyurethane dispersion, based on certain cycloaliphatic diisocyanates, for example, 1,3- and 1,4-bis(isocyanatomethyl)cyclohexane, that have been copolymerized with one or more oligomeric polyols and one or more chain extenders, and to articles produced therefrom.

Polyurethane dispersions can be formulated to yield polymers for use in a wide variety of applications. They consist of polyurethanes or poly(urethane-urea) polymers that are dispersed in solvents, water or various combinations thereof These dispersions are environmentally friendly materials with no unreacted isocyanate groups and make a good choice for the formulation of compliant polymers for many different applications.

The unique chemistry of polyurethanes means that it is possible to achieve large variations in properties by careful choice of the type and relative proportions of the monomers used. The polyurethane polymers are available in a variety of polymer hardness, can be readily blended with other water soluble polymers to optimize final performance, application properties and cost.

At one end of the spectrum, coating applications generally require a tough, durable polymer capable of withstanding a high temperature for a short period of time due to the application methodology. Conversely, sealants generally require a more elastomeric polymer characterized by good abrasion resistance, toughness, strength, extensibility, low temperature flexibility, chemical and oil resistance and other chemical and physical properties. In either case, the level of each of the resultant mechanical and chemical factors is dependent on the inherent properties of the component or building block materials making up any particular polyurethane.

Specifically, the case of original equipment manufacturers (OEM), the polymer is formulated to protect impact resistance, yet provide a high gloss, durable finish. In addition, OEM automotive coatings are typically baked at relatively high temperatures (about 93° C. and higher) to cure the compositions in a reasonably short time. Thus the polymer must demonstrate a reasonable level of temperature stability. For these reasons, the dispersion formulation often contain low molecular weight, highly functionalized resins that react with polyisocyanate crosslinkers to form polyurethane coatings with excellent durability, toughness, and solvent resistance. Alternatively, automotive refinish coatings are formulated as either thermoplastic compositions or thermosetting compositions that cure at relatively low temperatures. This is because the many plastic components of a finished vehicle cannot withstand high temperature bakes and because many of the collision repaid shops using the paint do not have equipment large enough to provide a baked finish on a vehicle. Thus, the refinish coating must provide the same level of protection, gloss and durability, but must be curable at much lower temperatures.

In sealant or elastomer applications, the polymer should demonstrate a high level of ductility and elastomer performance, and must also be able to perform over a wide temperature range. Coatings and sealants which cover a diversity of substrates must be able to handle the respective levels of thermal expansion or contraction without cracking or separating from the adjoining substrate. For this reason, the dispersion formulation often contain high molecular weight, low functional resins that react with polyisocyanate crosslinkers to form polyurethane polymers with excellent durability, toughness and solvent resistance.

In certain applications where a polyurethane product, particularly an elastomer, is used for a coating or outer surface of a product, it may be desirable for this polyurethane layer to remain transparent. Based on the chemical characteristics of polyisocyanates, there are few commercially available polyisocyanates that yield good quality polyurethanes with non-yellowing and good weatherability properties when combined with commercially available polyols and chain extenders.

Therefore there remains a need for polyurethanes with improved mechanical and/or chemical characteristics and/or for polyurethanes that are manufactured with polyisocyanates that have lower volatility and/or an increased ratio of isocyanate functionality to polyisocyanate molecular weight. Highly desirable polyurethanes would be those based on components that yield polymers having good mechanical and chemical characteristics, non-yellowing characteristics, good resistance to sunlight, good weatherability, transparency and that can achieve these properties in an environmentally friendly and cost-effective manner.

The present invention is a polyurethane dispersion comprising a mixture of a polyisocyanate and a molecule having hydrogen active moieties, optionally a chain extender and/or a surfactant wherein the polyisocyanate comprises a bis (isocyanatomethyl)cyclohexane compound.

In another aspect the invention is a polyurethane dispersion comprising a mixture of a polyisocyanate and a molecule having hydrogen active moieties, optionally a chain extender and/or a surfactant wherein the polyisocyanate comprises (i) trans-1,4-bis(isocyanatomethyl)cyclohexane or (ii) an isomeric mixture of two or more of cis-1,3-bis (isocyanatomethyl)cyclohexane, trans-1,3-bis(isocyanatomethyl)cyclohexane, cis-1,4-bis(isocyanatomethyl)cyclohexane and trans-1,4-bis(isocyanatomethyl)cyclohexane, with the proviso said isomeric mixture comprises at least about 5 weight percent of said trans-1,4-bis(isocyanatomethyl)cyclohexane.

In a further aspect, the invention is to the production of polyurethane products prepared from the dispersion described above.

The present invention is to a polyurethane dispersion and products produced therefrom wherein the dispersion contains a polyurethane prepolymer produced from the a reaction of an excess of a polyisocyanate with an isocyanate reactive molecule wherein the polyisocyanate is a bis(isocyanatomethyl)cyclohexane. Preferably the isocyanate comprises (i) trans-1,4-bis(isocyanatomethyl)cyclohexane or (ii) an isomeric mixture of two or more of cis-1,3-bis(isocyanatomethyl)cyclohexane, trans-1,3-bis(isocyanatomethyl) cyclohexane, cis-1,4-bis(isocyanatomethyl)cyclohexane and trans-1,4-bis(isocyanatomethyl)cyclohexane, with the proviso said isomeric mixture comprises at least about 5 weight percent of said trans-1,4-bis(isocyanatomethyl)cyclohexane. While polyurethane prepolymers may retain some isocyanate reactivity for some period of time after dispersion, for purposes of the present invention, a polyurethane prepolymer dispersion shall be considered as being a fully reacted polyurethane polymer dispersion. Also, for purposes of the present invention, a polyurethane prepolymer or polyurethane polymer can include other types of structures such as, for example, urea groups.

Polyurethane polymers, produced from the dispersions of the present invention have excellent strength characteristics, high temperature resistance good low temperature flexibility and excellent weathering characteristics including sunlight resistance in comparison to polyurethanes prepared from typical commercially available polyisocyanates.

Polyurethane prepolymers useful in the practice of the present invention are prepared by the reaction of active hydrogen compounds with any amount of isocyanate such that there is a stoichiometric excess of NCO groups to hydrogen reactive moieties, for example, —OH, amine or —SH groups. Isocyanate functionality in the prepolymers useful with the present invention can be present in an amount of from about 0.2 weight percent to about 20 weight percent. A suitable prepolymer can have a molecular weight in the range of from about 300 to about 10,000. Procedures for producing NCO terminated prepolymers are well known in the art.

The cycloaliphatic diisocyanates useful in this invention comprise (i) trans-1,4-bis(isocyanatomethyl)cyclohexane or (ii) an isomeric mixture of two or more of cis-1,3-bis (isocyanatomethyl)cyclohexane, trans-1,3-bis(isocyanatomethyl)cyclohexane, cis-1,4-bis(isocyanatomethyl)cyclohexane and trans-1,4-bis(isocyanatomethyl)cyclohexane, with the proviso said isomeric mixture comprises at least about 5 weight percent of said trans-1,4-bis(isocyanatomethyl)cyclohexane. The preferred cycloaliphatic diisocyanates are represented by the following structural Formulas I through IV:

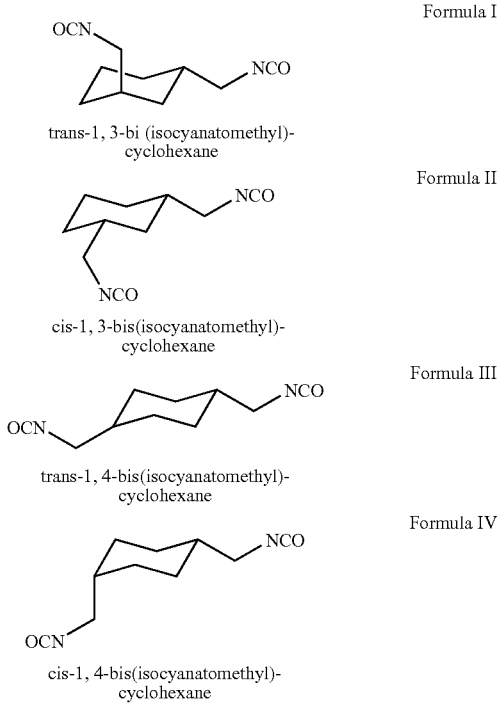

Formula I
trans-1, 3-bi (isocyanatomethyl)-cyclohexane

Formula II
cis-1, 3-bis(isocyanatomethyl)-cyclohexane

Formula III
trans-1, 4-bis(isocyanatomethyl)-cyclohexane

Formula IV
cis-1, 4-bis(isocyanatomethyl)-cyclohexane

These cycloaliphatic diisocyanates may be used in admixture as manufactured from, for example, the Diels-Alder reaction of butadiene and acrylonitrile, subsequent hydroformylation, then reductive amination to form the amine, that is, cis-1,3-bis(aminomethyl)cyclohexane, trans-1,3-bis (aminomethyl)cyclohexane, cis-1,4-bis(aminomethyl)cyclohexane and trans-1,4-bis(aminomethyl) cyclohexane cyclohexane, followed by reaction with phosgene to form the cycloaliphatic diisocyanate mixture. The preparation of the cyclohexane-bis(aminomethyl) is described in U.S. Pat. No. 6,252,121.

Optionally, minor amounts of other multifunctional isocyanates can be used in the reaction mixture. Illustrative of such isocyanates are 2,4- and 2,6-toluene diisocyanates, 4.4'-biphenylene diisocyanate, 4,4'-diphenylmethane diisocyanate, meta- and para-phenylene diisocyanates, 1,5-naphthylene diisocyanate, 1,6-hexamethylene diisocyanate, bis (2-isocyanato)fumarate, 4,4'dicyclohexanemethyl diisocyanate, 1,5-tetrahydronaphthylene diisocyanate, and isophorone diisocyanate. The minor amounts of other multifunctional isocyanates can range from about 0.1 percent to about 30 percent or more, preferably from about 0 percent to 20 percent, more preferably from 0 percent to 10 percent by weight of the total polyfunctional isocyanate used in the formulation.

The polyurethane prepolymer compositions of this invention contain from about 1 to 15 weight percent unreacted NCO, preferably from about 2 to 10 weight percent NCO, more preferably from 2 to 8 weight percent NCO.

Polyols useful in the present invention are compounds which contain two or more isocyanate reactive groups, generally active-hydrogen groups, such as —OH, primary or secondary amines, and —SH. Representative of suitable polyols are generally known and are described in such publications as *High Polymers*, Vol. XVI; "Polyurethanes, Chemistry and Technology", by Saunders and Frisch, Interscience Publishers, New York, Vol. I, pp. 32-42, 44-54 (1962) and Vol II. Pp. 5-6, 198-199 (1964); *Organic Polymer Chemistry* by K. J. Saunders, Chapman and Hall, London, pp. 323-325 (1973); and *Developments in Polyurethanes*, Vol. I, J. M. Burst, ed., Applied Science Publishers, pp. 1-76 (1978). Representative of suitable polyols include polyester, polylactone, polyether, polyolefin, polycarbonate polyols, and various other polyols.

Illustrative of the polyester polyols are the poly(alkylene alkanedioate) glycols that are prepared via a conventional esterification process using a molar excess of an aliphatic glycol with relation to an alkanedioic acid. Illustrative of the glycols that can be employed to prepare the polyesters are ethylene glycol, diethylene glycol, propylene glycol, dipropylene glycol, 1,3-propanediol, 1,4-butanediol and other butanediols, 1,5-pentanediol and other pentane diols, hexanediols, decanediols, and dodecanediols. Preferably the aliphatic glycol contains from 2 to about 8 carbon atoms. Illustrative of the dioic acids that may be used to prepare the polyesters are maleic acid, malonic acid, succinic acid, glutaric acid, adipic acid, 2-methyl-1,6-hexanoic acid, pimelic acid, suberic acid, and dodecanedioic acids. Preferably the alkanedioic acids contain from 4 to 12 carbon atoms. Illustrative of the polyester polyols are poly(hexanediol adipate), poly(butylene glycol adipate), poly(ethylene glycol adipate), poly(diethylene glycol adipate), poly (hexanediol oxalate),and poly(ethylene glycol sebecate).

Polylactone polyols useful in the practice of this invention are the di-or tri- or tetra-hydroxyl in nature. Such polyol are prepared by the reaction of a lactone monomer; illustrative of which is δ-valerolactone, ϵ-caprolactone, ϵ-methyl-ϵ-caprolactone, and ξ-enantholactone; is reacted with an initiator that has active hydrogen-containing groups; illustrative of which is ethylene glycol, diethylene glycol, propanediols, 1,4-butanediol, 1,6-hexanediol, and trimethylolpropane. The production of such polyols is known in the art, see, for example, U.S. Pat. Nos. 3,169,945, 3,248,417, 3,021,309 to 3,021,317. The preferred lactone polyols are the di-, tri-, and tetra-hydroxyl functional ϵ-caprolactone polyols known as polycaprolactone polyols.

The polyether polyols include those obtained by the alkoxylation of suitable starting molecules with an alkylene oxide, such as ethylene, propylene, butylene oxide, or a mixture thereof. Examples of initiator molecules include water, ammonia, aniline or polyhydric alcohols such as dihyric alcohols having a molecular weight of 62-399, especially the alkane polyols such as ethylene glycol, propylene glycol, hexamethylene diol, glycerol, trimethylol propane or trimethylol ethane, or the low molecular weight alcohols containing ether groups such as diethylene glycol, triethylene glycol, dipropylene glycol or tripropylene glycol. Other commonly used initiators include pentaerythritol, xylitol, arabitol, sorbitol and mannitol. Preferably a poly (propylene oxide) polyols include poly(oxypropylene-oxyethylene) polyols is used. Preferably the oxyethylene content should comprise less than about 40 weight percent of the total and preferably less than about 25 weight percent of the total weight of the polyol. The ethylene oxide can be incorporated in any manner along the polymer chain, which stated another way means that the ethylene oxide can be incorporated either in internal blocks, as terminal blocks, may be randomly distributed along the polymer chain, or may be randomly distributed in a terminal oxyethylene-oxypropylene block. These polyols are conventional materials prepared by conventional methods.

Other polyether polyols include the poly(tetramethylene oxide) polyols, also known as poly(oxytetramethylene) glycol, that are commercially available as diols. These polyols are prepared from the cationic ring-opening of tetrahydrofuran and termination with water as described in Dreyfuss, P. and M. P. Dreyfuss, Adv. Chem. Series, 91, 335 (1969).

Polycarbonate containing hydroxy groups include those known per se such as the products obtained from the reaction of diols such as propanediol-(1,3), butanediols-(1,4) and/or hexanediol-(1,6), diethylene glycol, triethylene glycol or tetraethylene glycol with diarylcarbonates, for example diphenylcarbonate or phosgene.

Illustrative of the various other polyols suitable for use in this invention are the styrene/allyl alcohol copolymers; alkoxylated adducts of dimethylol dicyclopentadiene; vinyl chloride/vinyl acetate/vinyl alcohol copolymers; vinyl chloride/vinyl acetate/hydroxypropyl acrylate copolymers, copolymers of 2-hydroxyethylacrylate, ethyl acrylate, and/ or butyl acrylate or 2-ethylhexyl acrylate; copolymers of hydroxypropyl acrylate, ethyl acrylate, and/or butyl acrylate or 2-ethylhexylacrylate.

Generally for use in the present invention, the hydroxyl terminated polyol has a number average molecular weight of 200 to 10,000. Preferably the polyol has a molecular weight of from 300 to 7,500. More preferably the polyol has a number average molecular weight of from 400 to 5,000. Based on the initiator for producing the polyol, the polyol will have a functionality of from 1.5 to 8. Preferably the polyol has a functionality of 2 to 4. For the production of elastomers based on the dispersions of the present invention, it is preferred that a polyol or blend of polyols is used such that the nominal functionality of the polyol or blend is equal or less than 3.

Alternatively, the dispersions contain a low molecular weight active-hydrogen containing polyoxyalkylene diol which serves to increase the number of urea or urethane linkages in the prepolymer. This in turn improves the mechanical properties (ultimate tensile strength, stress @ 100 percent elongation, modulus, and ultimate elongation) of the elastomer. When present, up to about 20 percent by weight of the polyurethane dispersion may contain such polyoxyalkylene diol. Suitable polyoxyalkylene diols include diethylene glycol (DEG), dipropylene glycol (DPG), and polyoxypropylene diol of weight average molecular weight less than about 500. When employed, the low molecular weight active hydrogen containing polyoxyalkylene diol is present in the dispersion in amounts of from 0.1 to about 10, preferably from about 2 to about 6 weight percent.

The present invention includes a chain extender or crosslinker. A chain extender is used to build the molecular weight of the polyurethane prepolymer by reaction of the chain extender with the isocyanate functionality in the polyurethane prepolymer, that is, chain extend the polyurethane prepolymer. A suitable chain extender or crosslinker is typically a low equivalent weight active hydrogen containing compound having about 2 or more active hydrogen groups per molecule. Chain extenders typically have 2 or more active hydrogen groups while crosslinkers have 3 or more active hydrogen groups. The active hydrogen groups can be hydroxyl, mercaptyl, or amino groups. An amine chain extender can be blocked, encapsulated, or otherwise rendered less reactive. Other materials, particularly water, can function to extend chain length and, therefore, can be chain extenders for purposes of the present invention.

The chain extenders may be aliphatic, cycloaliphatic, or aromatic and are exemplified by triols, tetraols, diamines, triamines, and aminoalcohols. Illustrative examples of amine chain extenders include N-methylethanolamine, N-methyliso-propylamine, 4-aminocyclohexanol, 1,2-diaminotheane, 1,3-diaminopropane, hexylmethylene diamine, methylene bis(aminocyclohexane), isophorone diamine, 1,3- or 1,4-bis(aminomethyl) cyclohexane or blends thereof, diethylenetriamine, toluene-2,4-diamine, and toluene-1,6-diamine.

Preferred chain extenders are the polyolamines due to their faster reaction with the isocyanate in the aqueous phase. It is particularly preferred that the chain extender be selected from the group consisting of amine terminated polyethers such as, for example, JEFFAMINE D-400 from Huntsman Chemical Company, amino ethyl piperazine, 2-methyl piperazine, 1,5-diamino-3-methyl-pentane, isophorone diamine, bis(aminomethyl) cyclohexane and isomers thereof, ethylene diamine, diethylene triamine, aminoethyl ethanolamine, triethylene tetraamine, triethylene pentaamine, ethanol amine, lysine in any of its stereoisomeric forms and salts thereof, hexane diamine, hydrazine and piperazine. In one embodiment, the chain extenders is the corresponding amine of the isocyanate used in preparing the prepolymer.

The chain extender can be modified to have pendant functionalities to further provide crosslinker, flame retardation, or other desirable properties. Suitable pendant groups include carboxylic acids, phosphates, halogenation, etc.

In the practice of a present invention, a chain extender is employed in an amount sufficient to react with from about zero to about 100 percent of the isocyanate functionality present in the prepolymer, based on one equivalent of isocyanate reacting with one equivalent of chain extender. The remaining isocyanate being reacted out with water. Preferably the chain extender is present in an amount to react with from 20 to about 98 of the isocyanate functionality and can be an amount to react with from 20 to 75 percent of the isocyanate. It can be desirable to allow water to act as a chain extender and react with some or all of the isocyanate functionality present. A catalyst can optionally be used to promote the reaction between a chain extender and an isocyanate. When chain extenders of the present invention have more than two active hydrogen groups, then they can also concurrently function as crosslinkers.

The relative amount of polyol to hard segment can be varied over a weight ratio of 10 to 60 wt percent hard segment, preferably 10 to 50 wt percent according the performance criteria required by the specific polymer application. The hard segment is the weight ratio of the number of grams of polyisocyanate required to react with the chain extender plus the grams of the chain extender divided by the total weight of the polyurethane.

The polyurethanes obtained differ in their properties according to the chemical composition selected and the content of urethane groups. Thus, it is possible to obtain soft, tacky compositions, thermoplastic and elastomeric products varying in hardness up to glasshard duroplasts. The hydrophilicity of the products may also vary within certain limits. The elastic products may be thermoplastically processed at elevated temperatures, for example at about 100 to 280° C., providing they are not chemically crosslinked.

Surfactants can be useful for preparing a stable dispersion of the present invention, and/or for preparing a stable froth. Surfactants useful for preparing a stable dispersion are optional in the practice of the present invention, and can be cationic surfactants, anionic surfactants, zwitterionic or a non-ionic surfactants. Examples of anionic surfactants include sulfonates, carboxylates, and phosphates. Examples of cationic surfactants include quaternary amines. Examples of non-ionic surfactants include block copolymers containing ethylene oxide and silicone surfactants. Surfactants useful in the practice of the present invention can be either external surfactants or internal surfactants. External surfactants are surfactants which do not become chemically reacted into the polymer during dispersion preparation. Examples of external surfactants useful herein include salts of dodecyl benzene sulfonic acid, and lauryl sulfonic acid salt. Internal surfactants are surfactants which do become chemically reacted into the polymer during dispersion preparation. An example of an internal surfactant useful herein includes 2,2-dimethylol propionic acid and its salts, quaternized ammonium salts, and hydrophilic species, such polyethylene oxide polyols. A surfactant can be included in a formulation of the present invention in an amount ranging from about 0.01 to about 8 parts per 100 parts by weight of polyurethane component.

Surfactants useful for preparing a stable froth are referred to herein as foam stabilizers. In addition to the surfactants described hereinabove, foam stabilizers can include, for example, sulfates, succinamates, and sulfosuccinamates. Any foam stabilizer known to useful by those of ordinary skill in the art of preparing polyurethane foams can be used with the present invention.

Generally, any method known to one skilled in the art of preparing polyurethane dispersions can be used in the practice of the present invention to prepare a polyurethane dispersions material of the present invention. A suitable storage-stable polyurethane dispersions as defined herein is any polyurethane dispersions having a mean particle size of less than about 5 microns. Preferably the particle size is between 0.1 and 1 micro. A polyurethane dispersions that is not storage-stable can have a mean particle size of greater than 5 microns. For example, a suitable dispersion can be prepared by mixing a polyurethane prepolymer with water and dispersing the prepolymer in the water using a mixer. Alternatively, a suitable dispersion can be prepared by feeding a prepolymer into a static mixing device along with water, and dispersing the water and prepolymer in the static mixer. Continuous methods for preparing aqueous dispersions of polyurethane are known and can be used in the practice of the present invention. For example, U.S. Pat. Nos.: 4,857,565; 4,742,095; 4,879,322; 3,437,624; 5,037,864; 5,221,710; 4,237,264; and 4,092,286 all describe continuous processes useful for preparing polyurethane dispersions. In addition, a polyurethane dispersion having a high internal phase ratio can be prepared by a continuous process such as is described in U.S. Pat. No. 5,539,021.

Polyurethane dispersion of the present invention can also be produced in an a solvent or water/solvent mixture, see for example, U.S. Pat. Nos. 3,479,310 and 4,858,565. Generally the solvent has a boiling point below 100° C. at normal pressure and are preferably inert to isocyanate groups. Examples of such solvents are toluene, ethylacetate, acetone, N-methylpyrollidone, methylethylketone, diethylether, tetrahydrofuran, methylacetate, acetonitrile, chloroform, methylene chloride, carbon tetrachloride, 1,2-dichloroethane, 1,1,2-trichloroethane or tetrachloroethylene. When a solvent is used, it is preferred to use water-miscible solvents, particularly acetone.

Other types of aqueous dispersions can be used in combination with the polyurethane dispersions of the present invention. Suitable dispersions useful for blending with polyurethane dispersions of the present invention include: styrene-butadiene dispersions; styrene-butadiene-vinylidene chloride dispersions; styrene-alkyl acrylate dispersions; ethylene vinyl acetate dispersions; polychloropropylene latexes; polyethylene copolymer latexes; ethylene styrene copolymer latexes; polyvinyl chloride latexes; or acrylic dispersions, like compounds, and mixtures thereof.

Generally the dispersion will contain 5 to 80 weight percent solids. Preferably the dispersion will contain 10 to 75 weight percent solids. More preferably, the dispersions will contain 30 to 70 weight percent solids.

The present invention optionally includes thickeners. Thickeners can be useful in the present invention to increase the viscosity of low viscosity polyurethane dispersions. Thickeners suitable for use in the practice of the present invention can be any known in the art. For example, suitable thickeners include ALCOGUM™ VEP-II (trade designation of Alco Chemical Corporation) and PARAGUM™ 241 (trade designation of Para-Chem Southern, Inc.). Thickeners can be used in any amount necessary to prepare a Compound of desired viscosity.

The present invention can include other optional components. For example, a formulation of the present invention can include surfactants, frothing agents, dispersants, thickeners, fire retardants, pigments, antistatic agents, reinforcing fibers, antioxidants, preservatives, biocides, and acid scavengers. Examples of suitable frothing agents include: gases and/or mixtures of gases such as, for example, air, carbon dioxide, nitrogen; argon, and helium. While optional for purposes of the present invention, some components can be highly advantageous for product stability during and after the manufacturing process. For example, inclusion of antioxidants, biocides, and preservatives can be highly advantageous in the practice of the present invention.

Preferred in the practice of this invention is the use of a gas as a frothing agent. Particularly preferable is the use of air as a frothing agent. Frothing agents are typically introduced by mechanical introduction of a gas into a liquid to form a froth, that is mechanical frothing. In preparing a frothed polyurethane backing, it is preferred to mix all components and then blend the gas into the mixture, using equipment such as an OAKES or FIRESTONE frother.

When it is desired to produce a film from the polyurethane dispersion of the invention, any other additive which is known to those of ordinary skill in the art of preparing films from dispersion can be used so long as their presence does not degrade the properties of the film so much that the film is no longer fit for its intended purposes. Such additives can be incorporated into the films in any way known to be useful including, but not limited to inclusion in the prepolymer formulation and inclusion in the water used to make the dispersion. For example titanium dioxide is useful for coloring films of the present invention. Other useful additives include calcium carbonate, silicon oxide, defoamers, biocides, carbon particles. A special embodiment of the present invention provides films pigmented with titanium dioxide, carbon black or other suitable pigments to render them opaque to ultraviolet radiation.

Catalysts are optional in the practice of the present invention. Catalysts suitable for use in preparing the polyurethanes and polyurethane prepolymers of the present invention include tertiary amines, and organometallic compounds, like compounds and mixtures thereof. For example, suitable catalysts include di-n-butyl tin bis(mercaptoacetic acid isooctyl ester), dimethyltin dilaurate, dibutyltin dilaurate, dibutyltin sulfide, stannous octoate, lead octoate, ferric acetylacetonate, bismuth carboxylates, triethylenediamine, N-methyl morpholine, like compounds and mixtures thereof. An amount of catalyst is advantageously employed such that a relatively rapid cure to a tack-free state can be obtained. If an organometallic catalyst is employed, such a cure can be obtained using from about 0.01 to about 0.5 parts per 100 parts of the polyurethane prepolymer, by weight. If a tertiary amine catalyst is employed, the catalyst preferably provides a suitable cure using from about 0.01 to about 3 parts of tertiary amine catalyst per 100 parts of the polyurethane-forming composition, by weight. Both an amine type catalyst and an organometallic catalyst can be employed in combination.

The dispersions of the present invention are useful for coating flexible and non-flexible substrates or used as part of a coating formulation for various material. In particular the dispersions can be used for preparing coatings for wood, textiles, plastics, metal, glass, fibers, medical applications, automotive interiors, leather as well as for adhesive applications for shoe soles, wood and glass. The dispersions can also be blended with waterborne acrylic dispersions or waterborne polyester resins for a variety of architectural and industrial coating applications. The dispersions of the present invention can also be used to prepare hybrid polyurethane particles as disclosed in publication WO02/055576.

The dispersions are generally stable, storable and transportable and may be processed at any later stage. They generally dry directly to form dimensionally stable plastic coatings, although forming of the process products may also be carried out in the presence of crosslinking agents known per se.

The following examples are provided to illustrate the present invention. The examples are not intended to limit the scope of the present invention and should not be so interpreted. All percentages are by weight unless otherwise noted.

EXAMPLES

ADA—1,3-bis(aminomethyl)cyclohexane available from Aldrich having approximately a 75:25 cis:trans ratio.
Isocyanate 1—A mixture of 1,3-bis(isocyanatomethyl)cyclohexane (55 percent) and 1,4-bis(isocyanatomethyl)cyclohexane (45 percent) isomers. Analysis of the mixture gave the following isomer amounts 25.5 percent 1,3-cis isomer, 29.1 percent 1,3-trans isomer, 30.9 percent 1,4-trans isomer and 14.5 percent 1,4-cis isomer.
Isocyanate 2—4,4'-methylene bis(cyclohexyl isocyanate) or 4,4'dicyclohexylmethane diisocyanate, commercially available from Bayer AG as Desmodur™ W. This isocyanate is also known as $H_{12}MDI$.
Isocyanate 3—5-isocyanato-1-(isocyanatomethyl)-1,3,3-trimethylcyclohexande available from Bayer AG or Rhodia. This diisocyanate is also known as isophorone diisocyanate or IPDI.
Isocyanate 4—A mixture of 1,3-bis(isocyanatomethyl)cyclohexane (50 percent) and 1,4-bis(isocyanatomethyl)cyclohexane (50 percent) isomers.
Isocyanate 5—1,4-bis(cyanatomethyl)cyclohexane containing approximately a 60:40 cis:trans isomer ratio.

Polyol 1—A polycaprolactone glycol (polyester polyol) with a number-average molecular weight of approximately 2000 available from The Dow Chemical Company as TONE™ 2241.
Polyol 2—A monofunctional polyethylene glycol with a molecular weight of about 950, available from The Dow Chemical Company as MPEG™ 950.
Polyol 3—A 1000 molecular weight polyethylene oxide diol available from The Dow Chemical Company as VORANOL™ E1000.
Polyol 4—A poly(oxytetramethylene) glycol with a number-average molecular weight of approximately 2,000.
Polyol 5—Rucoflex™ 1500-120, an adipic acid based polyester polyol obtained from Bayer AG having a molecular weight of approximately 1,000.
T-12—Dibutyltin dilaurate catalyst commercially available from Air Products Company as DABCO™ T-12.

Example 1

The viscosity of prepolymers prepared by blending various isocyanates with polyols is shown in FIG. 1. The viscosity is in centipose per second (cps) as measured with an AR-2000 rheometer in a cone/plate configuration using a gap of 1000 microns. The prepolymer are prepared in 32-oz glass bottles (800 g) using the materials weight ratios as given in Table 1.

TABLE 1

| | Composition (wt percent) | | | | |
|---|---|---|---|---|---|
| Isocyanate | Iso | Polyol 5 | Polyol 2 | Polyol 3 | percent NCO |
| $H_{12}MDI$ Comparative | 24.73 | 70.28 | 2 | 3 | 1.70 |
| IPDI Comparative | 24.73 | 70.30 | 2 | 3 | 3.01 |
| Isocyanate 1 Example 1 | 24.71 | 70.33 | 2 | 3 | 4.36 |

In this procedure, the polyols are melted in an oven (55° C.) and added to the isocyanates. One drop of benzoyl chloride (~50 ppm) per 800 g of prepolymer is added, and the mixture stirred under a nitrogen pad for a period of ten minutes and then placed in an oven at 90° C. The prepolymers are removed from the oven after 30 min., mixed and returned to the oven for a 10 hour period. The samples were then removed from the oven, allowed to cool to 60° C. and the percent NCO measured. The NCO measurement is the free isocyanate content that is available for further reaction.

The viscosity data shows the prepolymers of the present invention have a lower viscosity over the given temperature range as compared to prepolymers prepared from $H_{12}MDI$ or IPDI at the identical isocyanate/hard segment content.

Example 2

A polyurethane prepolymer is produced by preparing a polyol mixture of 768 grams of Polyol 1, 48 g of polyol 3, 24 grams of Polyol 2 and 48 grams of neopentyl glycol. This mixture is heated to 80° C. and mixed for 1 hour. This mixture is added on to 312 grams of 1,3/1,4 bis (isocyanatomethyl)cyclohexane solution and the resulting mixture is heated at 90° C. for 9 hours. The final product has 4.8 wt percent NCO. This prepolymer prepared is dispersed in a high shear continuous process to form an aqueous polyurethane dispersion. In this process, 100 grams of the prepolymer is introduced into a high shear mixer device where it is blended with a 3.02 grams (solid) aqueous solution of sodium dodecyl benzene sulfonate. The pre-emulsion formed is introduced into a secondary mixer where it is blended with 24 gram of deionized water and 6.85 gram of an ADA solution in 38 grams of water. The dispersion contains 56.5 wt percent solids content, 320 nm volume average particle size and lower than 1000 cps viscosity.

Example 3

Polyurethane dispersion are prepared by chain extending prepolymers prepared according to the procedure of Example 1. Separate 200 g samples of prepolymer are placed in 32 oz glass bottles equipped with a 2.75 inch Cowles blade. The blade is positioned such that the blade is just covered by the liquid prepolymer. To the prepolymer is added 21.3 g of an aqueous surfactant solution of sodium lauryl sulfate (29.5 percent active). To create a 45 percent solid dispersion, 237 g of water is added drop-wise to create an oil-in-water dispersion. As the phase inversion point is reached, the chain extender (ADA) is introduced to the prepolymer (10 wt percent solution in water). The dispersion is filtered and shelved 3 days before the films were cast. The weight ratios of materials used in preparing the dispersions is given in Table 2.

TABLE 2

| Isocyanate | Composition (wt percent) | | | | percent NCO | ADA (g)/200 g prepolymer | Hard segment (wt percent) |
| --- | --- | --- | --- | --- | --- | --- | --- |
| | Iso | Polyol 1 | Polyol 2 | Polyol 3 | | | |
| H$_{12}$MDI Comparative | 27.28 | 66.72 | 2 | 4 | 5.66 | 9.298 | 32 |
| IPDI Comparative | 26.95 | 67.05 | 2 | 4 | 6.96 | 11.43 | 32 |
| Isocyanate 1 Example 3 | 26.62 | 67.38 | 2 | 4 | 8.27 | 13.56 | 32 |

Thin films are prepared from the above dispersions by pouring 80 g of the dispersions onto a metal plate (6×10 in) whose edges are etched to hold the liquid dispersion on a plate. The films are allowed to stand overnight in a laboratory hood at ambient temperatures. Subsequently the films are placed in an oven, 120° C., for 20 minutes. After curing, the films are allowed to cool to ambient temperature (20 to 30 minutes). Next, the films are removed from the Teflon plates, placed between individual thin Teflon sheets and cured in a pre-heated pressure oven at a pressure of 20,000 psig and temperature of 120° C. for 60 minutes. After curing, the films are removed from the oven and the Teflon sheets, and allowed to cool on individual sheets of paper. Dogbone tensile specimens were cut, and the mechanical properties, ultimate tensile strength and percent elongation, of the films were measured using the ASTM D 412 testing method. The results of this test are given in Table 3.

TABLE 3

| Type of Polyisocyanate | Elongation (percent) | Stress @ 100° C. |
| --- | --- | --- |
| H$_{12}$MDI Comparative | 547 | 5,460.6 kpa (792 psi) |
| IPDI Comparative | 563 | 4,984.9 kpa (723 psi) |
| Example 3 | 636 | 3,709.4 kPa (538 psi) |

These results show the films of Example 3 had greater elongation with reduced stress as compared to the comparatives.

Example 4

To evaluate the effect of different chain extenders on the performance of dispersions using the isocyanates of the present invention, the procedure of Example 1 was used to prepare prepolymers based on the weight ratios given in Table 4.

TABLE 4

| Isocyanate | Composition (wt percent) | | | | Percent NCO | Viscosity in cps |
| --- | --- | --- | --- | --- | --- | --- |
| | Isocyanate | Polyol 1 | Polyol 2 | Polyol 3 | | |
| IPDI Comparative | 25 | 70 | 2 | 3 | 6.15 | 18,400 |
| Isocyanate 1 Example 4 | 25 | 70 | 2 | 3 | 7.4 | 8,000 |

The resulting prepolymers are dispersed in water containing 3 wt percent sodium dodecyl benzolyl sulfonate (LDS-22, available from Stepan Company). The prepolymers are then chain extended (98 percent based on amount of free wt percent NCO) with their analogous diamines (IPDA and 1,3/1,4-bis(aminomethyl)cyclohexane). The final dispersions have a solids content of about 50 wt percent. Films are cast on Teflon coated aluminum plates at 25° C. and 50 percent relative humidity for 7 days at constant thickness (~0.01-0.02 inch). The resulting mechanical properties of the films, as measured by ASTM D412 are given in Table 5.

TABLE 5

| Type of Isocyanate | Tensile Strength | Elongation (percent) | Stress @ 100° C. |
|---|---|---|---|
| IPDI Comparative | 1.88 × 10⁴ kPa (2726 psi) | 319 | 6,791.3 kPa (985 psi) |
| Example 4 | 2.16 × 10⁴ kPa (3133 psi) | 420 | 5,564.1 KPa (807 psi) |

The results show the elastomers prepared from isocyanate 1 has enhanced mechanical properties as compared to the use of IPDI.

Example 5

Polyol 4 (PTMG, 1000 grams) and dimethylolpropionic acid (DMPA, 134 grams) are placed in a reaction kettle equipped with a thermometer, a mechanical stirrer, a heating jacket and a dry nitrogen inlet The polyol and DMPA mixture are heated to about 130° C. and kept at that temperature until DMPA is completely dissolved and the solution becomes transparent. N-methylpyrrolidone (NMP) (to give 5 percent solvent) and T12 catalyst (0.25 wt percent based on solids) are added to the mixture after its temperature is decreased to 50° C. A stoichiometric excess of Isocyanate I is then added to the reaction kettle to give a calculated NCO:OH ratio of 1.8. The reaction temperature is then increased gradually to 85° C. and kept at this temperature until the percentage of NCO, determined by di-n-butylamine titration, reaches its theoretical value. When the difference between the percentage of measured NCO is within 10 percent of the theoretical prediction, the reaction temperature is lowered to 50° C. To the formed isocyanate terminated prepolymer is added 101 g of triethylamine (TEA) to neutralize the pendant COOH groups in the NCO-terminated prepolymer. After the neutralization process is completed (30 min.) water is added into the reaction kettle under vigorous stirring to accomplish dispersion of the pendant internal salt group-containing, NCO-terminated prepolymer. Chain extension is carried out by adding a mixture of ethylenediamine with water (1.0/1.0 ratio by weight). The addition of ethlenediamine is sufficient to fully react all the remaining free NCO groups. A few drops of a defoaming agent is added to the dispersion, mixed for a few minutes under mild agitation, filtered and stored in a glass jar.

As a comparative, the same procedure was used for the preparation of a polyurethane dispersion using isophorone diisocyanate (Isocyante 3)as the polyisocyanate. The properties elastomers prepared by the two polyurethane dispersions are given in Table 6.

TABLE 6

| Property | Example 5 Isocyanate 4 | Comparative Isocyanate 3 |
|---|---|---|
| NCO/OH (Equiv.) | 1.8 | 1.8 |
| Tensile Strength (psi) | 4.01 × 10⁴ kPa (5823 psi) | 3.56 × 10⁴ kPa (5165 psi) |
| Elongation (percent) | 829 | 708 |

TABLE 6-continued

| Property | Example 5 Isocyanate 4 | Comparative Isocyanate 3 |
|---|---|---|
| Modulus at 100 percent (psi) | 5,088.3 kPa (738 psi) | 5,558.0 kPa (808 psi) |

These results show the elastomer of Example 5 has a higher modulus with a lower tensile strength and lower percent elongation as compared to the comparative.

Example 6

To evaluate the effect of the 1,3- and 1,4-isomer ratios on the properties of an elastomer prepared from a polyurethane dispersion, elastomers are prepared at various ratios of 1,3- to 1,4-isomer concentrations. The prepolymers are chain extended with water or with the analogous amine of Isocyanate 1. For chain extension with water, the prepolymers are dispersed in water containing 3 wt percent LDS-22. Final-polyurethane dispersions have a solids content of about a 50 wt percent. For chain extension with the analogous amine of Isocyanate 1, the prepolymers are dispersed in water containing 3 wt percent LDS-22 to a 50 percent solids level and then analogous amine of Isocyante 1 is added at a 50 percent stoichiometry based on percent NCO.

Figure 2:
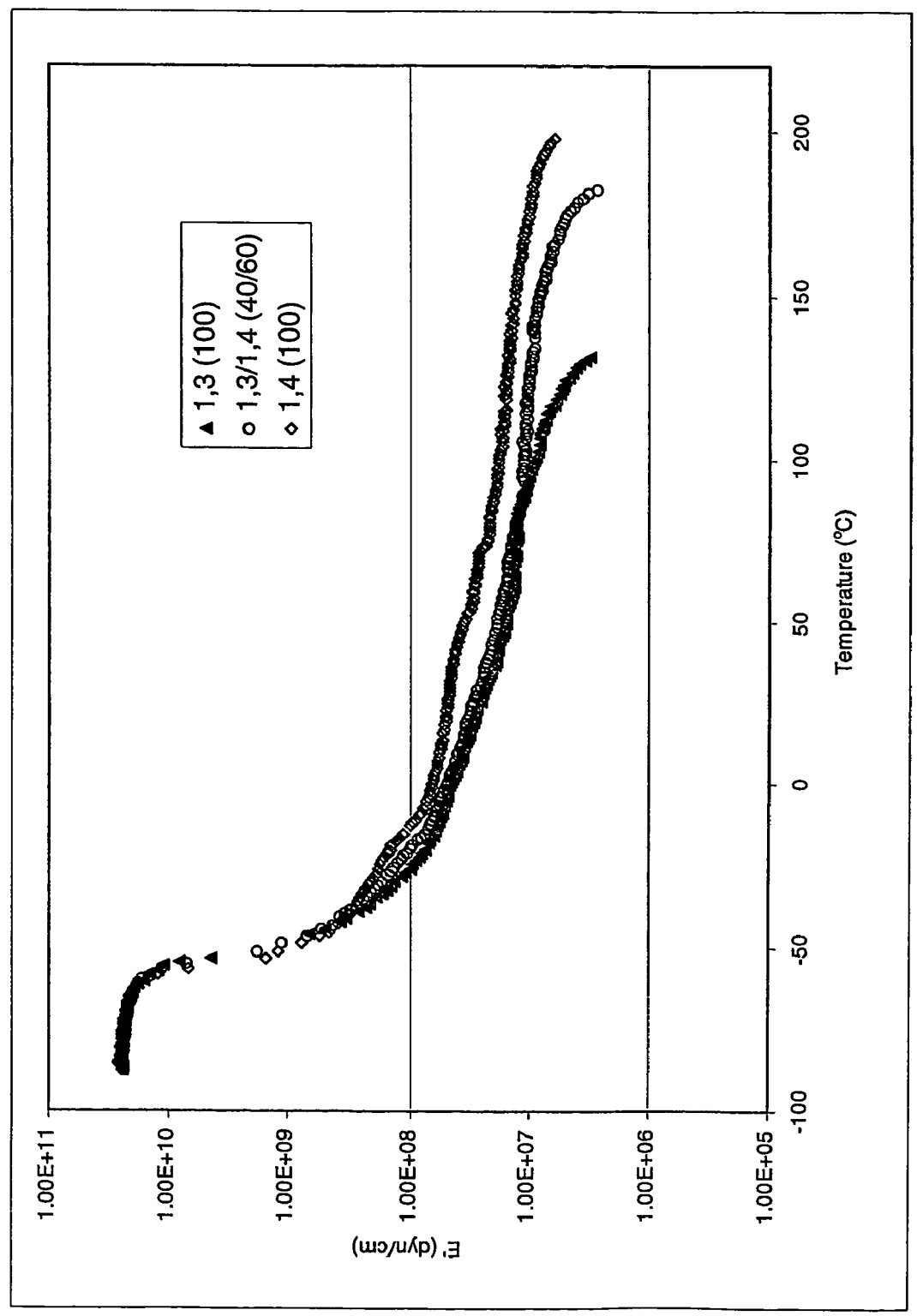

The mechanical properties of the elastomers, as measured by ASTM D412 are given in Table 7. Data from DMTA analysis (Dynamic Mechanical Thermal Analysis), FIG. 2, shows that an increase in the 1,4-isomer content results in significant improvements in the temperature stability as measured by the upper temperature break point. This means the polymers have a higher resistance to temperatures with the increases in 1,4 content.

TABLE 7

| 1,3/1-4 isomer ratio | Water Chain Extended | | Analogous amine of Isocyanate 1 (chain extender)) | |
|---|---|---|---|---|
| | Elongation (percent) | Stress @ 100° C. | Elongation (percent) | Stress @ 100° C. |
| 100/0 | 992 | 174 | 816 | 296 |
| 80/20 | 962 | 172 | 742 | 330 |
| 60/40 | 837 | 196 | 747 | 331 |
| 55/45 | 814 | 196 | 733 | 324 |
| 40/60 | 793 | 196 | 696 | 366 |
| 20/80 | 734 | 223 | 681 | 386 |
| 0/100 | 688 | 250 | 634 | 324 |

The increases in the 1,4 content results in increases in the modulus and decreases in the elongation. Polymers having low ratio of 1,3 contents produce excellent soft elastomers while increasing 1,4-isomer content may be used to produce coatings having higher modulus.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. An aqueous polyurethane dispersion consisting of a polyurethane prepolymer produced from the reaction of an excess of a polyisocyanate and a molecule having hydrogen active moieties, optionally a chain extender, and optionally a surfactant, wherein the polyisocyanate consists of (i) trans-1,4-bis(isocyanatomethyl)cyclohexane or (ii) an isomeric mixture of two or more of cis-1,3-bis(isocyanatomethyl)cyclohexane, trans-1,3-bis(isocyanatomethyl)cyclohexane, cis-1,4-bis(isocyanatomethyl)cyclohexane and trans-1,4-bis(isocyanatomethyl)cyclohexane, with the proviso said isomeric mixture consists of at least about 5 weight percent of said trans-1,4-bis(isocyanatomethyl)cyclohexane, wherein the dispersion further consists of from about 0.01 to about 0.5 parts organometallic compounds per 100 parts polyurethane prepolymer, by weight.

2. The dispersion of claim 1 wherein the molecule having hydrogen active moieties is a polyol or polyol blend having a weight average molecular weight of 300 to 10,000 and an average functionality of 1.8 to 4.5.

3. The dispersion of claim 2 wherein the polyol is an aliphatic or aromatic polyol selected from a polyester, a polyether, polylactone, polyolefin, polycarbonate or a blend thereof.

4. The dispersion of claim 1 wherein the dispersion contains a polyamine chain extender.

5. The dispersion of claim 4 wherein the chain extender is selected from piperazine, ethylenediamine or bis(aminomethyl)cyclohexane.

6. The dispersion of claim 1 wherein the dispersion contains an anionic, ionic, cationic or zwitterionic external surfactant.

7. The dispersion of claim 1 wherein the dispersion is stabilized by means of an internal surfactant.

8. A coating, film, elastomer or microcellular foam produced from the dispersion of claim 1.

9. A ultraviolet or light stable coating, film or elastomer produced from the dispersion of claim 1.

10. A polyurethane dispersion consisting essentially of a polyurethane prepolymer produced from the reaction of an excess of a polyisocyanate and a polyol having a weight average molecular weight of 300 to 10,000 and an average functionality of 1.8 to 4.5, optionally a chain extender and optionally a surfactant, wherein the polyisocyanate consists essentially of a bis(isocyanatomethyl)cyclohexane compound, and wherein the polyol is an aliphatic or aromatic polyol selected from a polyester, a polyether, polyactone, polyolefin, polycarbonate or a blend thereof; wherein the dispersion further consists essentially of from about 0.01 to about 0.5 parts organometallic compounds per 100 parts polyurethane prepolymer, by weight.

11. A polyurethane dispersion comprising a polyurethane prepolymer produced from the reaction of an excess of a polyisocyanate and a molecule having hydrogen active moieties, optionally a chain extender and optionally a surfactant, wherein the polyisocyanate comprises a bis(isocyanatomethyl)cyclohexane compound, wherein the dispersion comprises 30 to 75 weight percent solids, and wherein the solids comprise particles having a mean particle size of less than about 5 microns; wherein the dispersion further comprises from about 0.01 to about 0.5 parts organometallic compounds per 100 parts polyurethane prepolymer, by weight.

12. The dispersion of claim 11 further comprising tertiary amines.

13. The dispersion of claim 11 wherein the polyurethane is dispersed in an aqueous medium.

14. The dispersion of claim 13 wherein the aqueous medium comprises less than 5 percent residual organic solvent.

15. The dispersion of claim 11 wherein the molecule having hydrogen active moieties is a polyol or polyol blend having a weight average molecular weight of 300 to 10,000 and an average functionality of 1.8 to 4.5.

16. The dispersion of claim 15 wherein the polyol is an aliphatic or aromatic polyol selected from a polyester, a polyether, polylactone, polyolefin, polycarbonate or a blend thereof.

17. The dispersion of claim 11 wherein the dispersion comprises a polyamine chain extender.

18. The dispersion of claim 17 wherein the chain extender is selected from piperazine, ethylenediamine or bis(aminomethyl)cyclohexane.

19. The dispersion of claim 11 wherein the dispersion comprises 30 to 75 weight percent solids.

20. The dispersion of claim 11 wherein the dispersion comprises an anionic, ionic, cationic or zwitterionic external surfactant.

21. The dispersion of claim 11 wherein the dispersion is stabilized by means of an internal surfactant.

22. A coating, film, elastomer or microcellular foam produced from the dispersion of claim 11.

23. A ultraviolet or light stable coating, film or elastomer produced from the dispersion of claim 11.

24. The dispersion of claim 11 wherein the polyisocyanate comprises 0.1 to 20 percent by weight of at least one polyisocyanate other than bis(isocyanatomethyl)cyclohexane.

* * * * *